United States Patent [19]

Buchardt et al.

[11] Patent Number: 5,077,344

[45] Date of Patent: Dec. 31, 1991

[54] POLYMER MODIFICATION

[76] Inventors: Ole Buchardt, Soendergaardsvej 73, DK-3500 Vaerloese; Henrik F. Hansen, Taarnvej 33A,st., DK-2610 Roedovre; Roald B. Jensen, Nygaards Plads 15, 2.th., DK-2605 Broendby, all of Denmark

[21] Appl. No.: 75,599

[22] Filed: Jul. 20, 1987

[30] Foreign Application Priority Data

Jul. 22, 1986 [GB] United Kingdom .................. 8617879

[51] Int. Cl.$^5$ ................................................ C08F 8/30
[52] U.S. Cl. .................................. 525/350; 525/330.5; 525/351; 525/354; 525/366; 525/367; 525/370; 525/371; 525/375; 525/379; 525/382

[58] Field of Search ...................... 525/330.5, 350, 351, 525/354, 366, 367, 370, 371, 375, 379, 382

[56] References Cited

U.S. PATENT DOCUMENTS

| | | | |
|---|---|---|---|
| 3,290,416 | 12/1966 | Christenson et al. | 525/330.5 |
| 4,120,839 | 10/1978 | Emmons et al. | 525/330.5 |
| 4,613,653 | 9/1986 | Kitchens et al. | 525/352 |

*Primary Examiner*—Bernard Lipman

[57] ABSTRACT

Method for modifying polymers with pendant carboxyl groups through reaction with nucleophilic reagent, e.g., sulfide, selenide, cyanide, to produce a carrier on which biologically active materials such as enzymes may be immobilized.

7 Claims, No Drawings

POLYMER MODIFICATION

BACKGROUND OF THE INVENTION

The present invention relates to the chemical functionalization and modification of polymer surfaces for the purpose of improving and varying their properties. This will improve their utility for a wide variety of medical, biological and technical purposes.

The areas of such use of polymeric materials include fixation (immobilization) of biologically active material such as enzymes, thereby improving their practical use, as well as opening the possibility for changing their properties (protein engineering), C.M. Sturgeon and J.K. Kennedy, "Literature Survey", Enzyme Microb. Technol. 7, 182–183 (1985) and O. Zaborsky, Ed., "Immobilized Enzymes", Table of Contents, CRC, Cleveland 1973, in chromatography, including affinity chromatography, C.M. Sturgeon and J.K. Kennedy, "Literature Survey", Enzyme Microb. Technol. 7, 182–183 (1985), gene technology, J.A. Langdale and A.D.B. Malcolm, Gene, 36, 201–210 (1985), for various medical uses, M. Neftzger, J. Krenter, R. Voges, E. Liehl and R. Czok, J. Pharm. Sci., 73, 1309–1311 (1984) and H.E. Kambic, S. Murabayashi and Y. Nose, Chem. Eng. News, April 14, 1986, 31–48, as well as for many other purposes, e.g. S.R. Goldstein, J.I. Petersen and R.V. Fitzgerald, J. Biomed. eng. 102, 141–146 (1980).

Previously such modification of polymeric surfaces has been attempted in a multitude of ways. Probably the best known type of materials consists of the large varieties of modified silicas and glasses which have previously been used as chromatographic materials. Dextrans and Sephadex ® as well as related carbohydrate polymers are also well known both as general chromatographic materials, and, after modification, for affinity chromatography, etc. None of the presently known and used materials are optimal, and there is consequently a high demand for further improvements.

SUMMARY OF THE INVENTION

It has now surprisingly been found that polymeric materials having pendant esterified carboxyl groups, in particular polymethylmethacrylate, can be efficiently modified by a hitherto unknown method, whereby nucleophilic reagents act as catalysts in reactions whereby materials containing one or more nucleophilic groups are very strongly, presumably covalently, bound to the polymer. Examples of nucleophilic reagents include anionic reagents, e.g., RSH (where R signifies an organic radical or hydrogen) and salts containing halogenide ions, sulfide and hydrogen sulfide ions, isocyanate and isothiocyanate ions, cyanide and azide ions.

DETAILED DESCRIPTION OF THE INVENTION

Thus according to the present invention there is provided a method for chemically modifying a polymeric material having pendant esterified carboxyl groups which comprises reacting the polymeric material with a nucleophilic reagent.

The invention is particularly applicable to polymeric materials having pendant esterified carboxyl groups of the formula —COOR$^1$ wherein R$^1$ is C$_{1-6}$ alkyl. Such polymeric materials include methyl methacrylate polymers and copolymers, e.g. polymethylmethacrylate.

In accordance with a particularly preferred aspect of the invention, the nucleophilic reagent acts as a catalyst for activating at least a portion of the esterified carboxyl groups for reaction with one or more additional molecular species containing one or more nucleophilic centres.

Although the detailed molecular chemistry is not yet clarified, it is believed that the nucleophilic reagent causes activation of the ester groups in the polymeric material, thereby permitting these to undergo attack from the nucleophilic groups of the additional molecular species which are subsequently bound to the polymer.

These additional molecular species may further contain functional units which are not utilized in the reaction with the esterified carboxyl groups, e.g., amino groups, acid groups (carboxylic, sulfonic, various phosphorous derived ones, etc), hydroxy groups, thioether and mercapto groups (optionally protected by later removable groups) or carbonyl groups (likewise optionally protected or derivatized), etc. Such functional groups can subsequently be used for linking further molecular species to the polymeric material, including sandwiching whereby the amount of material bound to the polymeric material can be increased to the required degree. Another use of the functional groups with which the polymeric material can be modified will be found in the fixation of other low or high molecular species. e.g., peptides, proteins, antibodies or fragments thereof, polyamines, mono-oligopolysaccharides, nucleic acids, allergenic groups, fluorescent groups or various types of reactive reagents for reduction, oxidation, conjugation, catching, solvolysis or condensation, etc. Furthermore, such species may be directly bound to the polymeric material through their nucleophilic centers using the catalytic reagents.

The following Examples illustrate the method of the invention.

EXAMPLE 1

Binding of polyethyleneimine (PA) to polymethylmethacrylate (PMMA)

PMMA-granulae (PMA, Elvacite ® 2008, Dupont, 4 g) were suspended in a mixture of 20% w/w aqueous polyethyleneimine (PA, Polyamine SN, BASF, 4 ml) and potassium cyanide (100 mg, 1.5 mmol) dissolved in water (4 ml). The suspension was gently agitated for 24 h after which time the PMMA was isolated by filtration and washed very thoroughly with water (1 l), 4 N hydrochloric acid (100 ml), water (1 l), conc. aqueous sodium hydroxide (25 ml) and water (2 l). The PMMA granulae were finally dried over anhydrous calcium chloride, in vacuo. The degree of PA-fixation was measured spectrophotometrically at 546 nm using the ninhydrine reaction with the residual free primary and secondary amino groups as follows.

PMMA-granulae (200 mg) were dissolved in chloroform (3 ml), 0.3% ninhydrine in butanol containing 3% acetic acid (2 ml) was added and the volume adjusted to 10 ml with chloroform. This solution was kept at 45° C. for about 5 h after which the extinction was measured in 1 cm cuvettes. As standard was used non-bonded PA.

Analogously PA was fixed to PMMA using potassium isothiocyanate, sodium sulfide, sodium fluoride, sodium azide and potassium iodide, as well as various non-ionic species. The results are summarized in Table 1.

TABLE 1

| Catalyst (1.5 mmol) | PA-fixation on PMMA Amount of PA bound | |
|---|---|---|
| | relative | ~µg/g PMMA |
| KCN | 1.00 | 250 |
| KSCN | 1.00 | 250 |
| Na₂S | 1.50 | 375 |
| NaF | 0.60 | 150 |
| NaN₃ | 0.50 | 125 |
| KI | 0.50 | 125 |

EXAMPLE 2

Binding of hexamethylenediamine to PMMA

PMMA-granulae (10 g) were treated with hexamethylenediamine (1.16 g, 10.0 mmol) and potassium cyanide analogously to the method described in Example 1. The granulae were shown to be aminated by a positive ninhydrine reaction performed as described in Example 1.

EXAMPLE 3

Binding of dodecamethylenediamine to PMMA

PMMA-granulae (10 g) were treated with dodecamethylenediamine (2.00 g, 10.0 mmol) using potassium cyanide as catalyst analogously to the method described in Example 2. The granulae were shown to be aminated by a positive ninhydrin reaction performed as described in Example 1.

EXAMPLE 4

Binding of spermidine to PMMA

PMMA-granulae (10 g) were treated with spermidine (1.45 g, 10.0 mmol) analogously to the method described in Example 2. The granulae were shown to be aminated as described in Example 2.

EXAMPLE 5

Binding of spermine to PMMA

PMMA-granulae (10 g) were treated with spermine (2.10 g, 10.0 mmol) analogously to the method described in Example 2. the granulae were shown to be aminated as described in Example 2.

EXAMPLE 6

PMMA-granulae (10 g) were suspended in a solution containing L-lysine (2.92 g, 10.0 mmol) and potassium cyanide (200 mg, 3.00 mmol) in water (20 ml) and gently agitated for 24 h. Subsequently the PMMA granulae were filtered off and washed thoroughly with water (1 l), 4 N hydrochloric acid (100 ml), 0.1 M potassium dihydrogenphosphate solution (100 ml) and water (2 l). The granulae were dried over anhydrous calcium chloride, in vacuo. The dried granulae were shown to be lysinated by ninhydrin analysis as described in Example 1.

EXAMPLE 7

Binding of 4-aminobutanoic acid to PMMA

PMMA (10 g) was suspended in a solution containing 4-aminobutanoic acid (1.03 g, 10.0 mmol) and potassium cyanide (200 mg, 3.00 mmol) in 0.5 N sodium hydroxide (20 ml). The suspension was gently shaken for 24 h after which time the PMMA was treated as described in Example 6. This PMMA was shown to contain carboxylic acid groups by its ability to bind polyethyleneimine as evidenced by a positive ninhydrine reaction in an analysis performed as described in Example 1.

EXAMPLE 8

Binding of 6-aminohexanoic acid to PMMA

PMMA (10 g) and 6-aminohexanoic acid (1.31 g, 10.0 mmol) was treated analogously to the method described in Example 7. The modification was verified as described in Example 7.

EXAMPLE 9

Binding of D,L-serine to PMMA

PMMA (10 g) was suspended in a solution of 0.5 M sodium hydroxide (20 ml) containing serine (1.03 g, 10.0 mmol) and potassium cyanide (200 mg, 3.00 mmol). The suspension was subsequently treated as described in Example 7. The resulting PMMA showed a negative ninhydrine reaction but was able to retain some polyethyleneimine.

EXAMPLE 10

Binding of Dextran (MW 16000 Dalton, AD 17-0479-00 to PMMA

PMMA (10 g) was suspended in a solution of Dextran (2 g) and sodium cyanide (400 mg, 6.00 mmol) in water (20 ml) and treated further as described in Example 1. Apart from the fact that the tactile character of the resulting PMMA was changed, the dextran modification was evidenced by subsequently activating the surface with cyanogen bromide and treating with polyethyleneimine. The resulting double-modified PMMA gave a very strong ninhydrine reaction by the method described in Example 1. As a function test for the dextrane binding and in order to illustrate the applicability of the modification of PMMA, the cyanogen bromide activated PMMA was treated with β-galactosidase. This resulted in β-galactosidase fixation which was shown by the resulting β-galactosidase activity of the granulae.

EXAMPLE 11

Binding of ethylene glycol, glycertol and sorbitol to PMMA

These species were bound to PMMA by analogy with the procedure described in Example 10, and the PMMA-modification was ascertained by analogy with the methods described in Example 10.

EXAMPLE 12

Binding of cystamine to PMMA

PMMA (10 g) was suspended in a solution containing cystamine, 2HCl (2.25 g, 10.0 mmol) and potassium cyanide (200 mg, 3.00 mmol) in 0.5 M sodium hydroxide (40 ml) and the suspension was treated by analogy with the method described in Example 5. The attachment of cystamine was ascertained by a positive ninhydrine reaction as described in Example 1.

EXAMPLE 13

Binding of aminoacetaldehyde dimethylacetal to PMMA

PMMA (10 g) was suspended in a solution containing aminoacetaldehyde dimethylacetal (1.78 g, 20.0 mmol) and potassium cyanide (400 mg, 6.00 mmol) in water (25 ml). The suspension was gently agitated for 24 h after which time the PMMA was washed with water (2 1) and isolated by filtration and dried over anhydrous calcium chloride, in vacuo.

We claim:

1. A method of coupling a substance containing at least one nucleophilic center thereon to a polymeric material having pendant esterified carboxyl groups which comprises modifying said polymeric material by reacting a solid form of said polymeric material with a nucleophilic reagent, the nucleophilic reagent being from an anionic species selected from the group consisting of $I^-$, $S^{2-}$, $HS^-$, $Se^-$, $HSe^-$, $RS^-$,, $RSe^-$, $CN^-$, $SCN^-$, $OCN^-$, $F^-$ and $N_3-$, where R represents a non-interfering organic group, the nucleophilic reagent activating at least a portion of the esterified carboxyl groups for reaction with a substance having at least one nucleophilic center thereon selected from the group consisting of a polyethyleneimine, a dextran, ethylene glycol, glycerol, sorbitol, 6-amino hexanoic acid and serine, and reacting such substance with said activated polymeric material.

2. A method according to claim 1, wherein said substance is a polyethyleneimine which is linked to the polymeric material by said reaction.

3. A method according to claim 1, wherein said substance is a dextran which is linked to the polymeric material by said reaction.

4. A method according to claim 1 wherein the esterified carboxyl groups have the formulae $-COOR^1$ where $R^1$ is $C_{1-6}$ alkyl.

5. A method according to claim 4, wherein the polymeric material comprises a polymer or copolymer of methylmethacrylate.

6. A method according to claim 5, wherein the polymeric material is polymethylmethacrylate.

7. A method according to claim 5, wherein the nucleophilic reagent is KCN.

* * * * *